United States Patent
Bian

(10) Patent No.: US 10,444,562 B2
(45) Date of Patent: Oct. 15, 2019

(54) LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Fengling Bian, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 138 days.

(21) Appl. No.: 15/735,960

(22) PCT Filed: Nov. 2, 2017

(86) PCT No.: PCT/CN2017/109111
§ 371 (c)(1),
(2) Date: Dec. 13, 2017

(87) PCT Pub. No.: WO2019/056507
PCT Pub. Date: Mar. 28, 2019

(65) Prior Publication Data
US 2019/0094609 A1    Mar. 28, 2019

(30) Foreign Application Priority Data
Sep. 25, 2017 (CN) .......................... 2017 1 0872906

(51) Int. Cl.
*G02F 1/1335* (2006.01)
*G02F 1/1362* (2006.01)
*G02F 1/1337* (2006.01)
*G02F 1/1343* (2006.01)

(52) U.S. Cl.
CPC .. *G02F 1/133526* (2013.01); *G02F 1/133512* (2013.01); *G02F 1/133707* (2013.01); *G02F 1/136209* (2013.01); *G02F 1/134309* (2013.01); *G02F 2203/28* (2013.01)

(58) Field of Classification Search
None
See application file for complete search history.

(56) References Cited

U.S. PATENT DOCUMENTS 7,202,928 B2 * 4/2007 Lee .................. G02F 1/134363
349/106

* cited by examiner

*Primary Examiner* — Richard H Kim
(74) *Attorney, Agent, or Firm* — Mark M. Friedman

(57) ABSTRACT

The present invention provides a liquid crystal display panel, the liquid crystal display panel includes a color filter substrate, an array substrate, and liquid crystal molecules located between the color filter substrate and the array substrate. The array substrate includes a pixel electrode layer. The pixel electrode layer includes at least one pixel electrode unit. The pixel electrode unit is configured to focus light irradiated to the pixel electrode unit onto a central area of the circular ring, to generate a bright state of the liquid crystal display panel.

18 Claims, 2 Drawing Sheets

LIQUID CRYSTAL DISPLAY PANEL

CROSS REFERENCE TO RELATED APPLICATIONS

This application is a U.S. National Phase application submitted under 35 U.S.C. § 371 of Patent Cooperation Treaty Application serial No. PCT/CN2017/109111, filed on Nov. 2, 2017, which claims the priority of China Patent Application serial No. 201710872906.6, filed on Sep. 25, 2017, the disclosures of which are incorporated herein by reference in their entirety.

FIELD OF INVENTION

The present invention relates to the field of liquid crystal displays, and more particularly to a liquid crystal display panel.

BACKGROUND OF INVENTION

Liquid crystal displays (LCDs) are most widely used display products on the market. Production technologies are very mature, product yield is high, production costs are relatively low, and market acceptance is high.

A liquid crystal display panel is generally constructed by a color filter substrate, a thin film transistor array substrate, and a liquid crystal layer disposed between the two substrates. The liquid crystal display panel is respectively provided with a pixel electrode on an inner side of one of the substrates and a common electrode on an opposite inner side of another substrate. Applying a voltage changes orientation of the liquid crystal is changed, and light generated by the backlight module refracts the light to produce an image. Liquid crystal displays include several different display modes, such as twisted nematic (TN) mode, electronically controlled birefringence (ECB) mode, vertical alignment (VA) mode, etc.

In conventional LCDs, two layers of polarizers are usually used to polarize the light. However, transmittance of a polarizer is generally about 40%. Therefore, a maximum transmittance of the conventional LCDs is only about 20% and cannot be used in transparent displays. In general LCD production, attachment of a polarizer needs manual or automatic machine operation, since problems during the operation results in a certain number of defective pieces appearing, such as dust, bubbles, offset, etc., and the process is difficult, and production yield/benefits are not good enough.

Therefore, in order to improve brightness of a liquid crystal display, a non-polarizer LCD display has begun to enter the field of vision. FIG. 1 is a schematic view of a film structure of a liquid crystal display according to conventional art. The liquid crystal display includes a color filter substrate, an array substrate, and a liquid crystal molecule layer 10 located between the color filter substrate and the array substrate. The color filter substrate includes a first substrate 20, a black matrix 30, a color resist layer, and a common electrode layer 40. The array substrate includes a second substrate 50, a thin film transistor layer 60, and a pixel electrode layer 70. In addition, a certain amount of network polymer 80 is also contained in the liquid crystal molecule layer 10. The implementation of this technique also enables liquid crystal molecules have some differences from the traditional liquid crystal, so that a starting voltage of the liquid crystal display panel in the conventional art is greatly increased, and the structure of liquid crystal molecules is increasingly complicated.

SUMMARY OF INVENTION

The present invention provides a liquid crystal display panel, a liquid crystal lens structure replaces the conventional non-polarizer structure, thereby a starting voltage of a liquid crystal display panel is reduced, and the contrast of the liquid crystal display panel is improved.

In order to solve the above-mentioned problems, the technical solutions provided by the present invention are as follows:

The present invention provides a liquid crystal display panel, comprising:

a color filter substrate including:
a first substrate;
a first black matrix formed on the first substrate, and having at least one opening; and
a common electrode layer formed on the first substrate;
an array substrate disposed opposite to the color filter substrate, and including:
a second substrate; and
a second black matrix formed on the second substrate, and having at least one first protrusion disposed opposite to the first opening and aligned with the first opening one by one; wherein the first protrusion is selected from one of regular shapes, including triangle, quadrilateral, circle, and ellipse; and an area of the first protrusion is equal to or smaller than an area of the first opening; and
a pixel electrode layer formed on the second black matrix, and having at least one pixel electrode unit, wherein the pixel electrode unit is constructed by at least one circular ring, the pixel electrode unit is configured to focus light irradiated to the pixel electrode unit onto a central area of the circular ring, so as to generate a bright state of the liquid crystal display panel.

According to a preferred embodiment of the present invention, liquid crystal display panel further comprises a liquid crystal layer disposed between the pixel electrode layer and the common electrode layer.

According to a preferred embodiment of the present invention, the array substrate further comprises a thin-film transistor layer formed on the second substrate, and the thin-film transistor layer is electrically connected with the pixel electrode layer through vias.

According to a preferred embodiment of the present invention, the thin-film transistor layer comprises a buffer layer, an active layer, a gate insulating layer, a gate layer, an inter-insulating layer, and a source and drain layer.

According to a preferred embodiment of the present invention, the thin-film transistor layer further comprises at least one thin film transistor unit, and each of the at least one thin film transistor unit corresponds to at least one liquid crystal lens unit.

According to a preferred embodiment of the present invention, the liquid crystal lens unit is constructed by the common electrode layer, the pixel electrode layer and liquid crystal molecules corresponding to the pixel electrode unit.

According to a preferred embodiment of the present invention, the color filter substrate further comprises a color resist layer formed on the first substrate, and the color resist layer covers the first substrate and the first black matrix.

According to a preferred embodiment of the present invention, the first opening is selected from one of regular shapes, including triangle, quadrilateral, circle, and ellipse.

According to a preferred embodiment of the present invention, the liquid crystal display panel further comprises a first protective coating and a second protective coating; wherein the first protective coating is formed on the first black matrix, and covers the first substrate and the first black matrix; and the second protective coating is formed on the second black matrix, and covers the second substrate and the second black matrix.

The present invention further provides a liquid crystal display panel, comprising:
a color filter substrate including:
a first substrate;
a first black matrix formed on the first substrate, and having at least one opening; and
a common electrode layer formed on the first substrate;
an array substrate disposed opposite to the color filter substrate, and including:
a second substrate; and
a second black matrix formed on the second substrate, and having at least one first protrusion disposed opposite to the first opening and aligned with the first opening one by one; and
a pixel electrode layer formed on the second black matrix, and having at least one pixel electrode unit, wherein the pixel electrode unit is constructed by at least one circular ring, the pixel electrode unit is configured to focus light irradiated to the pixel electrode unit onto a central area of the circular ring, so as to generate a bright state of the liquid crystal display panel.

According to a preferred embodiment of the present invention, liquid crystal display panel further comprises a liquid crystal layer disposed between the pixel electrode layer and the common electrode layer.

According to a preferred embodiment of the present invention, the array substrate further comprises a thin-film transistor layer formed on the second substrate, and the thin-film transistor layer is electrically connected with the pixel electrode layer through vias.

According to a preferred embodiment of the present invention, the thin-film transistor layer comprises a buffer layer, an active layer, a gate insulating layer, a gate layer, an inter-insulating layer, and a source and drain layer.

According to a preferred embodiment of the present invention, the thin-film transistor layer further comprises at least one thin film transistor unit, and each of the at least one thin film transistor unit corresponds to at least one liquid crystal lens unit.

According to a preferred embodiment of the present invention, the liquid crystal lens unit is constructed by the common electrode layer, and the pixel electrode layer and liquid crystal molecules correspond to the pixel electrode unit.

According to a preferred embodiment of the present invention, the color filter substrate further comprises a color resist layer formed on the first substrate, and the color resist layer covers the first substrate and the first black matrix.

According to a preferred embodiment of the present invention, the first opening is selected from one of regular shapes, including triangle, quadrilateral, circle, and ellipse.

According to a preferred embodiment of the present invention, the liquid crystal display panel further comprises a first protective coating and a second protective coating; wherein the first protective coating is formed on the first black matrix, and covers the first substrate and the first black matrix; and the second protective coating is formed on the second black matrix, and covers the second substrate and the second black matrix.

Compared with the conventional art, the present invention uses a liquid crystal lens structure replaces the conventional non-polarizer structure, the liquid crystal lens structure is constructed by a common electrode layer, a pixel electrode layer and liquid crystal molecules in a liquid crystal layer. The liquid crystal lens according to the present invention can replace the conventional liquid crystal molecules, thereby the production costs are reduced, a starting voltage of a liquid crystal display panel is reduced, and the contrast of the liquid crystal display panel is improved.

DESCRIPTION OF DRAWINGS

In order to more clearly illustrate the technical solutions in the embodiments or the prior art, the following drawings, which are intended to be used in the description of the embodiments or the prior art, will be briefly described. It will be apparent that the drawings and the following description are only some embodiments of the present invention. Those of ordinary skill in the art may, without creative efforts, derive other drawings from these drawings.

DETAILED DESCRIPTION OF PREFERRED EMBODIMENTS

The structure and the technical means adopted by the present invention to achieve the above and other objects may be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, etc., are only directions by referring to the accompanying drawings, and thus the used directional terms are used to describe and understand the present invention, but the present invention is not limited thereto.

The present invention provides a liquid crystal display panel, a liquid crystal lens structure replaces the conventional non-polarizer structure, thereby a starting voltage of a liquid crystal display panel is reduced, and the contrast of the liquid crystal display panel is improved. An embodiment according to the present invention can solve this drawback.

Figure 1:
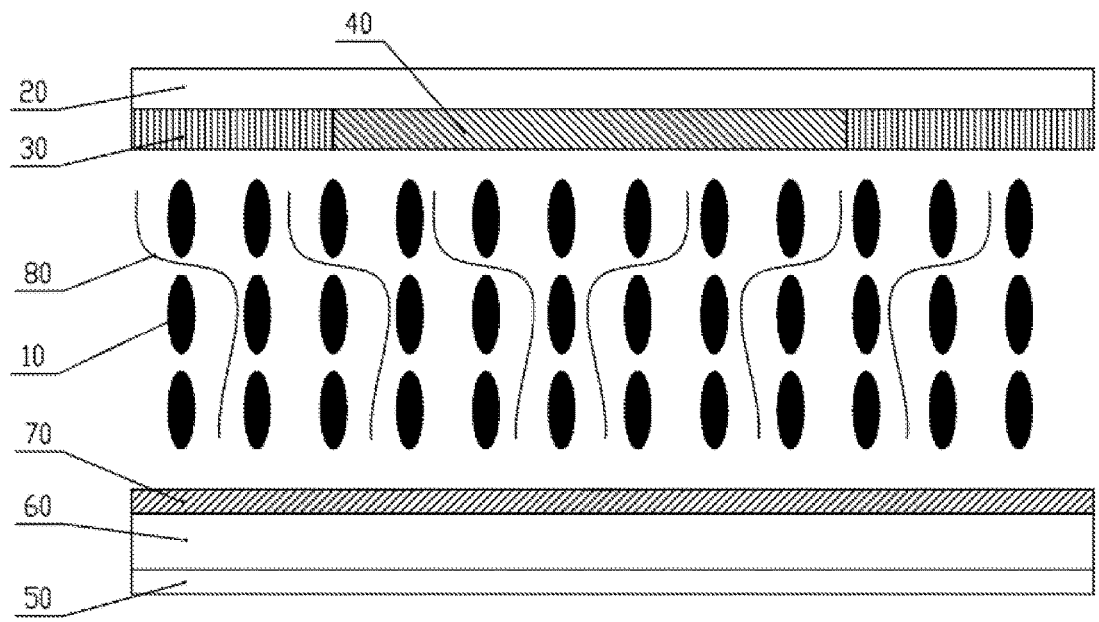
FIG. 1 is a schematic view of a circuit of a pixel structure according to the conventional art.
Figure 2:
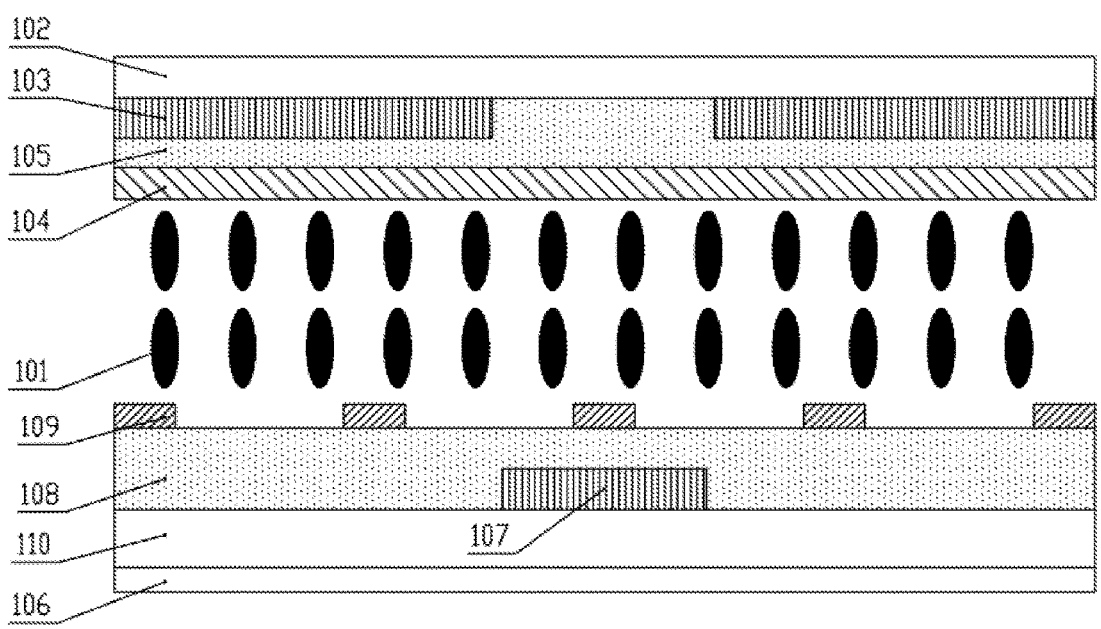
FIG. 2 is a schematic view of a circuit of a pixel structure according to a preferred embodiment of the present invention.

FIG. 2 illustrates a film structure of a liquid crystal display panel according to a preferred embodiment of the present invention, the liquid crystal display panel includes a color filter substrate, an array substrate disposed opposite to the color filter substrate, and liquid crystal molecules 101 located between the color filter substrate and the array substrate.

The color filter substrate includes a first substrate 102 and a first black matrix 103. The black matrix includes a plurality of horizontal light shielding strips for shielding a plurality of scanning lines and a plurality of vertical light shielding strips for shielding a plurality of data lines.

Preferably, the first substrate 102 is usually made of monocrystalline silicon or polycrystalline silicon. A black matrix layer firstly is formed on the first substrate 102. A photoresist layer is coated on the first black matrix 103, and at least one opening 111 is formed on the black matrix by using a mask through the patterning process such as exposure, development, etching, stripping, at least one first opening 111 on the black matrix through a patterning process of exposure, development, etching, stripping etc. The first opening 111 may be any regular shape including triangle, quadrilateral, circle, ellipse, etc. In the present embodiment, preferably, the first opening 111 is circle.

In addition, the color filter substrate further includes a color resist layer and a common electrode layer 104. The color filter layer includes a plurality of red color resist units, a plurality of green color resist units and a plurality of blue color resist units. Each of thin film transistor units 112 corresponds to one of the color resist units. A first protective coating layer 105 is deposited on the color resist layer, the first protective coating layer covers the color resist layer and the first black matrix 103, and ensures the flatness of the protective coating layer. Here, since the presence of the first black matrix 103 causes deformation of a surface of the array substrate or cause dislocation or tilt of structures formed on a surface of the array substrate, so that the liquid crystal display panel displays abnormally, so the presence of the first protective coating layer 105 ensures the flatness of the array substrate. Although the first protective coating layer 105 ensures the flatness of the plane, however, when light generated from a light source passes through the protective coating layer, the light intensity will lose about 3% based on the original penetration rate.

Then, the common electrode layer 104 is deposited on the protective coating layer, the material of the common electrode is a transparent conductive material such as zinc tin oxide and indium tin oxide.

The array substrate includes a second substrate 106, a second black matrix 107, a second protective coating layer 108 and a pixel electrode layer 109. The second black matrix 107 has at least one first protrusion 115, at least one first protrusion 115 is disposed opposite to the first opening 111, an area of the first protrusion 115 is equal to or smaller than an area of the first opening 111, and the first protrusion 115 is aligned with the first opening 111 one by one. The first protrusion 115 is selected from one of regular shapes, including triangle, quadrilateral, circle and ellipse. In the present embodiment, preferably, the first protrusion 115 is circle.

The second protective coating layer 108 is formed on the second black matrix 107, and covers the second black matrix 107 and the second substrate 106. The second protective coating layer 108 has the same function as the first protective coating layer 105, and ensure the flatness of the second protective coating layer 108, and thus prevent since the presence of the second black matrix 107 causes deformation of a profile of the array substrate or cause dislocation or tilt of structures of the array substrate, so that the liquid crystal display panel displays abnormally.

The pixel electrode is formed on the second protective coating layer 108, the material of the pixel electrode is same as the material of the common electrode, such as zinc tin oxide and indium tin oxide and other transparent conductive material. The pixel electrode layer includes at least one pixel electrode unit 113, each of the at least one pixel electrode unit 113 is constructed by at least one circular ring, which is configured to focus light onto a central area of the circular ring, so as to generate a bright state of the liquid crystal display panel.

After the pixel electrode layer is patterned, each of the at least one pixel electrode unit 113 is formed on the first protrusion 115. Two of the pixel electrode units 113 are electrically connected through a pixel electrode line 114. In the present embodiment, the pixel electrode solution is coated on the second protective coating layer 108, then a solvent in the transparent metal solution is removed by using baking or other methods and the solution-type transparent metal is cured. The pixel electrode is connected to a thin film transistor layer 110 in the second substrate 106 through at least one via. Preferably, a shape of the pixel electrode is a ring shape;

In addition, the array substrate further includes the thin film transistor layer 110 formed on the second substrate 106. The thin film transistor layer 110 includes a buffer layer, an active layer, a gate insulating layer, a gate layer, an inter-insulating layer, and a source and drain layer.

The buffer layer is disposed on a surface of the second substrate 106, the active layer is disposed on a surface of the buffer layer, the gate insulating layer is disposed on a surface of the active layer, and completely covers the active layer and the buffer layer. The gate insulating layer is deposited on the active layer by a chemical method. In the present embodiment, the material of the gate insulating layer may be silicon nitride, and also may be silicon oxide or silicon oxynitride etc. The gate layer is formed on a surface of the gate insulating layer, and the gate layer is patterned by a first metal layer so as to form a gate and a gate line of the thin film transistor. Preferably, the film of the first metal layer is deposited by magnetron sputtering. In the present embodiment, the material of the first metal layer may be molybdenum, aluminum, aluminum-nickel alloy, molybdenum-tungsten alloy, chromium, copper or other metal, and also possible may be a structure to use a combination of the above-mentioned material films. The inter-insulating layer is disposed on a surface of the first metal layer and covers the first metal layer and the gate insulating layer, so as to isolate the first metal layer and a second metal layer. The source and drain layer is formed on the inter-insulating layer, the source and drain layer are patterned by the second metal layer so as to form the source and the drain of the thin film transistor layer 110. The material of the second metal layer is same as the material of the first metal layer.

In addition, each of the thin film transistor layer 110 includes at least one thin film transistor unit 112, each of the at least one thin film transistor unit 112 corresponds to at least one liquid crystal lens unit. The at least one liquid crystal lens unit is constructed by the common electrode layer, the pixel electrode layer and liquid crystal molecules corresponding to the pixel electrode unit. Each of the at least one liquid crystal lens unit has one of the pixel electrode units 113.

Figure 3A:
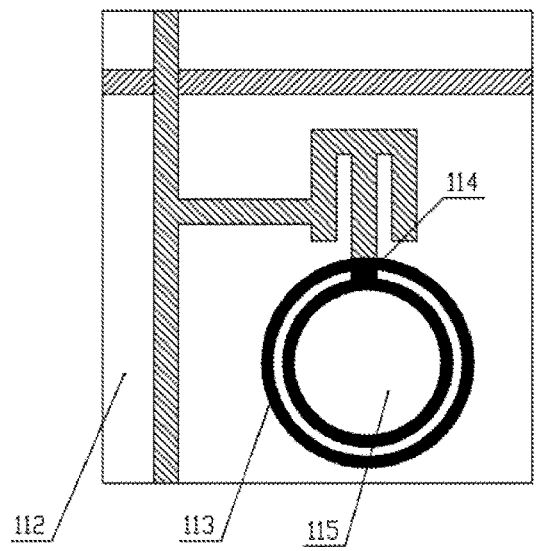
FIGS. 3A and 3B are a top view of a pixel structure according to a first preferred embodiment of the present invention.
Figure 3B:
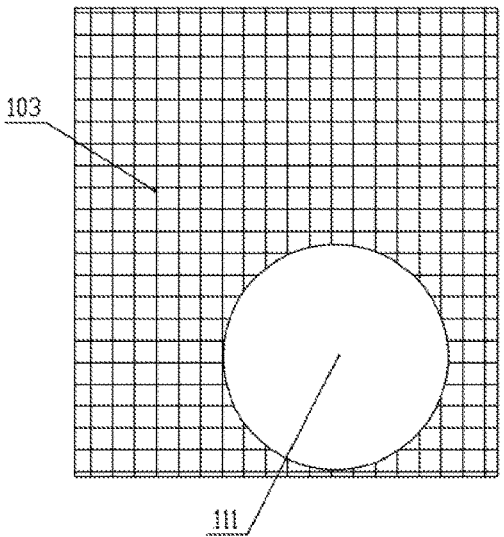
Figure 4A:
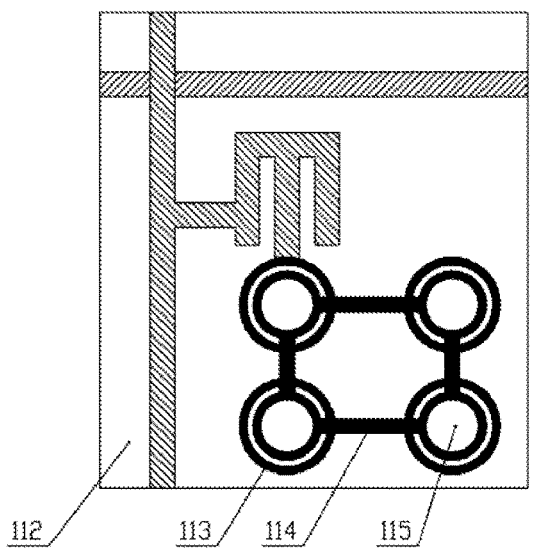
FIGS. 4A and 4B are a top view of a pixel structure according to a second preferred embodiment of the present invention.
Figure 4B:
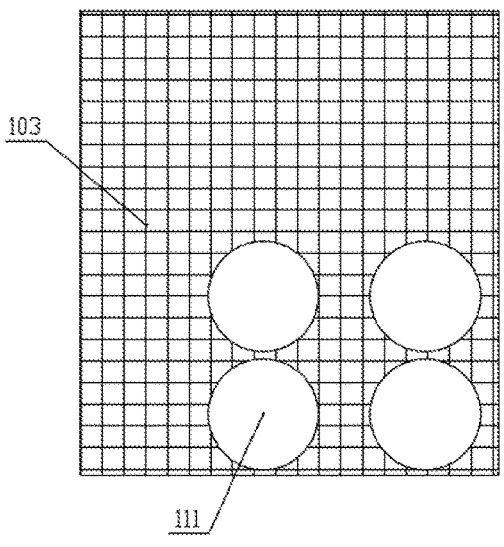

FIGS. 3A and 3B are a first preferred embodiment of the present invention. As illustrated, in one of thin film transistor units 112, the thin film transistor unit 112 corresponds to one liquid crystal lens unit. FIGS. 4A and 4B are a second preferred embodiment of the present invention. As illustrated, in one of thin film transistor units 112, the thin film transistor unit 112 corresponds to four liquid crystal lens units. Each of the liquid crystal lens units includes a pixel electrode unit 113. In the present embodiment, each of the pixel electrode units 113 has two concentric rings. Two of the pixel electrode units 113 are electrically connected through a pixel electrode line 114. The pixel electrode unit 113 is configured to focus the light irradiated to the pixel electrode unit 113 onto a central area of the circular ring, so as to generate a bright state of the liquid crystal display panel.

In addition, the number of the liquid crystal lens units in each of the thin film transistor units 112 can be selected according to requirements of different pixel density, the larger number of the liquid crystal lens units in a single thin film transistor unit 112, means the larger the pixel density in a liquid crystal display panel, and vice versa.

Both a color filter substrate and an array substrate have a black matrix, a first black matrix 103 and a second black matrix 107 can simultaneously function as a light-shielding, so as to reasonably adjust a brightness of a LCD panel.

The present invention provides a liquid crystal display panel, the liquid crystal display panel includes a color filter substrate, an array substrate disposed opposite to the color filter substrate, and liquid crystal molecules located between the color filter substrate and the array substrate. The array substrate includes a second substrate, a second black matrix, a pixel electrode layer and a thin film transistor layer. The pixel electrode layer includes at least one pixel electrode unit. The at least one pixel electrode unit is constructed by at least one circular ring, the pixel electrode unit is configured to focus light onto a central area of the circular ring, so as to generate a bright state of the liquid crystal display panel. A liquid crystal lens structure constructed by a common electrode layer, a pixel electrode layer and liquid crystal molecules located in a liquid crystal layer according to present invention replaces the conventional non-polarizer structure. The liquid crystal lens according to the present invention can replace the conventional liquid crystal molecules, thereby the production costs are reduced, a starting voltage of a liquid crystal display panel is reduced, and the contrast of the liquid crystal display panel is improved.

In view of the above, although the present invention has been disclosed by way of preferred embodiments, the above preferred embodiments are not intended to limit the present invention, and one of ordinary skill in the art, without departing from the spirit and scope of the invention, the scope of protection of the present invention is defined by the scope of the claims.

What is claimed is:

1. A liquid crystal display panel, comprising:
a color filter substrate including:
a first substrate;
a first black matrix formed on the first substrate, and having at least one opening; and
a common electrode layer formed on the first substrate;
an array substrate disposed opposite to the color filter substrate, and including:
a second substrate; and
a second black matrix formed on the second substrate, and having at least one first protrusion disposed opposite to the first opening and aligned with the first opening one by one; wherein the first protrusion is selected from one of regular shapes, including triangle, quadrilateral, circle, and ellipse; and an area of the first protrusion is equal to or smaller than an area of the first opening; and
a pixel electrode layer formed on the second black matrix, and having at least one pixel electrode unit, wherein the pixel electrode unit is constructed by at least one circular ring, the pixel electrode unit is configured to focus light irradiated to the pixel electrode unit onto a central area of the circular ring, to generate a bright state of the liquid crystal display panel.

2. The liquid crystal display panel according to claim 1, wherein liquid crystal display panel further comprises a liquid crystal layer disposed between the pixel electrode layer and the common electrode layer.

3. The liquid crystal display panel according to claim 1, wherein the array substrate further comprises a thin-film transistor layer formed on the second substrate, and the thin-film transistor layer is electrically connected with the pixel electrode layer through vias.

4. The liquid crystal display panel according to claim 3, wherein the thin-film transistor layer comprises a buffer layer, an active layer, a gate insulating layer, a gate layer, an inter-insulating layer, and a source and drain layer.

5. The liquid crystal display panel according to claim 3, wherein the thin-film transistor layer further comprises at least one thin film transistor unit, and each of the at least one thin film transistor unit corresponds to at least one liquid crystal lens unit.

6. The liquid crystal display panel according to claim 5, wherein the liquid crystal lens unit is constructed by the common electrode layer, the pixel electrode layer and the liquid crystal molecules corresponding to the pixel electrode unit.

7. The liquid crystal display panel according to claim 1, wherein the color filter substrate further comprises a color resist layer formed on the first substrate, and the color resist layer covers the first substrate and the first black matrix.

8. The liquid crystal display panel according to claim 1, wherein the first opening is selected from one of regular shapes, including triangle, quadrilateral, circle, and ellipse.

9. The liquid crystal display panel according to claim 1, wherein the liquid crystal display panel further comprises a first protective coating and a second protective coating; wherein the first protective coating is formed on the first black matrix, and covers the first substrate and the first black matrix; and the second protective coating is formed on the second black matrix, and covers the second substrate and the second black matrix.

10. A liquid crystal display panel, comprising:
a color filter substrate including:
a first substrate;
a first black matrix formed on the first substrate, and having at least one opening; and
a common electrode layer formed on the first substrate;
an array substrate disposed opposite to the color filter substrate, and including:
a second substrate; and
a second black matrix formed on the second substrate, and having at least one first protrusion disposed opposite to the first opening and aligned with the first opening one by one; and
a pixel electrode layer formed on the second black matrix, and having at least one pixel electrode unit, wherein the pixel electrode unit is constructed by at least one circular ring, the pixel electrode unit is configured to focus light irradiated to the pixel electrode unit onto a central area of the circular ring, so as to generate a bright state of the liquid crystal display panel.

11. The liquid crystal display panel according to claim 10, wherein liquid crystal display panel further comprises a liquid crystal layer disposed between the pixel electrode layer and the common electrode layer.

12. The liquid crystal display panel according to claim 10, wherein the array substrate further comprises a thin-film transistor layer formed on the second substrate, and the thin-film transistor layer is electrically connected with the pixel electrode layer through vias.

13. The liquid crystal display panel according to claim 12, wherein the thin-film transistor layer comprises a buffer layer, an active layer, a gate insulating layer, a gate layer, an inter-insulating layer, and a source and drain layer.

14. The liquid crystal display panel according to claim 12, wherein the thin-film transistor layer further comprises at least one thin film transistor unit, and each of the at least one thin film transistor units corresponds to at least one liquid crystal lens unit.

15. The liquid crystal display panel according to claim 14, wherein the liquid crystal lens unit is constructed by the common electrode layer, and the pixel electrode layer and the liquid crystal molecules corresponding to the pixel electrode unit.

16. The liquid crystal display panel according to claim 10, wherein the color filter substrate further comprises a color resist layer formed on the first substrate, and the color resist layer covers the first substrate and the first black matrix.

17. The liquid crystal display panel according to claim 10, wherein the first opening is selected from one of regular shapes, including triangle, quadrilateral, circle, and ellipse.

18. The liquid crystal display panel according to claim 10, wherein the liquid crystal display panel further comprises a first protective coating and a second protective coating; wherein the first protective coating is formed on the first black matrix, and covers the first substrate and the first black matrix; and the second protective coating is formed on the second black matrix, and covers the second substrate and the second black matrix.

* * * * *